United States Patent
Gupta et al.

(10) Patent No.: US 11,409,893 B2
(45) Date of Patent: Aug. 9, 2022

(54) SECURITY FOR DIVERSE COMPUTING ENVIRONMENTS

(71) Applicant: Teradata US, Inc., Dayton, OH (US)

(72) Inventors: Vikkal Gupta, Secunderabad (IN); Ram Prasad Reddy, Hyderabad (IN)

(73) Assignee: Teradata US, Inc., San Diego, CA (US)

(*) Notice: Subject to any disclaimer, the term of this patent is extended or adjusted under 35 U.S.C. 154(b) by 39 days.

(21) Appl. No.: 16/199,485

(22) Filed: Nov. 26, 2018

(65) Prior Publication Data

US 2019/0205559 A1 Jul. 4, 2019

Related U.S. Application Data

(60) Provisional application No. 62/611,284, filed on Dec. 28, 2017.

(51) Int. Cl.
| | | |
|---|---|---|
| *G06F 21/00* | (2013.01) | |
| *H04L 29/06* | (2006.01) | |
| *G06F 21/62* | (2013.01) | |
| *H04L 67/01* | (2022.01) | |
| *H04L 9/40* | (2022.01) | |
| *H04L 9/32* | (2006.01) | |
| *H04L 9/08* | (2006.01) | |

(52) U.S. Cl.
CPC ........ *G06F 21/6218* (2013.01); *H04L 9/0894* (2013.01); *H04L 9/3213* (2013.01); *H04L 63/10* (2013.01); *H04L 67/42* (2013.01)

(58) Field of Classification Search
CPC . G06F 21/6218; H04L 9/0894; H04L 9/3213; H04L 63/10
See application file for complete search history.

(56) References Cited

U.S. PATENT DOCUMENTS

| | | | |
|---|---|---|---|
| 2014/0337959 A1* | 11/2014 | Garmark | H04L 63/0807 726/9 |
| 2015/0350179 A1* | 12/2015 | Kobayashi | H04L 9/3273 726/4 |
| 2016/0224977 A1* | 8/2016 | Sabba | G06Q 20/385 |
| 2016/0366118 A1* | 12/2016 | Wang | H04L 63/0807 |
| 2018/0375863 A1* | 12/2018 | Fan | G06F 21/41 |

* cited by examiner

*Primary Examiner* — Anthony D Brown
*Assistant Examiner* — Rodman Alexander Mahmoudi
(74) *Attorney, Agent, or Firm* — Ramin Mahboubian (57) ABSTRACT

A security mechanism, e.g., a computing system, security server, can effectively serve as a centralized security mechanism, e.g., a computing system, security server, for an ecosystem that can include diverse clients and servers. The security mechanism can obtain redirected requests for services, authenticate credentials of a client and generate a (client-side) token that can be provided by the client to the server for verification of the identity of the client. The security mechanism can also obtain a token from a server that can be similar to a (client-side) token provided to a client and then generate a (server-side) token that can be provided to a server. The server-side token can include authorization information that allows access to one or more services of one or more other servers.

19 Claims, 6 Drawing Sheets

SECURITY FOR DIVERSE COMPUTING ENVIRONMENTS

CROSS REFERENCE TO RELATED APPLICATIONS

This application claims priority under 35 U.S.C. § 119(e) to the following and commonly-assigned patent application, which is incorporated herein by reference:

Provisional Patent Application Ser. No. 62/611,284, entitled "SECURITY FOR DIVERSE COMPUTING ENVIRONMENTS," filed on Dec. 28, 2017, by Vikkal Gupta and Ram Prasad Reddy.

BACKGROUND

In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more of the "database users." A user of a database can, for example, be a person, a database administrator, a computer application designed to interact with a database, etc. A very simple database or database system can, for example, be provided on a Personal Computer (PC) by storing data, e.g., contact information, on a Hard Disk and executing a computer program that allows access to the data. The executable computer program can be referred to as a database program, or a database management program. The executable computer program can, for example, retrieve and display data, e.g., a list of names with their phone numbers, based on a request submitted by a person, e.g., show me the phone numbers of all my friends in Ohio.

Generally, database systems are much more complex than the example noted above. In addition, databases have been evolved over the years and are used in various business and organizations, e.g., banks, retail stores, governmental agencies, universities. Today, databases can be very complex. Some databases can support several users simultaneously and allow them to make very complex queries, e.g., give me the names of all customers under the age of thirty-five (35) in Ohio that have bought all the items in a given list of items in the past month and also have bought a ticket for a baseball game and purchased a baseball hat in the past 10 years.

Typically, a Database Manager (DBM) or a Database Management System (DBMS) is provided for relatively large and/or complex databases. As known in the art, a DBMS can effectively manage the database or data stored in a database and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages, e.g., Data Description Languages, Data Manipulation Languages, Query Languages. Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, database systems can be very large and extremely complex, partly in order to support an ever increasing need to store data and analyze data. Typically, larger databases are used by larger organizations, larger user communities, or device populations. Larger databases can be supported by relatively larger capacities, including computing capacity, e.g., processor and memory, to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular, a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Today, database systems with multiple processing nodes can be very effective for storing and processing data. For example, in a multi-node database system, each node can be provided with one or more processing units. A processing unit in a node can be provided with one or more physical processors that each support one or more virtual processors.

Each node of a multi-node database system can, for example, have its own storage for storing data of the database. Generally, data stored in a database can be assigned for storage and/or processing to a processing unit or to a node of the database system. Ideally, data should be distrusted between the nodes and/or processing units in an effective manner and database queries should be processed in a manner that would allow effective use of all of the nodes and/or processing units of the multi-node database system to extend possible or needed.

A more recent development is emergence of increasingly more diverse computing environments. By way of example, an ecosystem can provide various servers including, database server, analytical platforms, replication servers, and various micro services. Today, echo systems can include a wide variety of clients and diverse servers provided by a wide variety of servers. It is also anticipated that eco systems will become even more diverse in the near future. One important aspect of these eco systems is security. Typically, security includes verification of the entities that typically request services as well authorization of the services to them.

In view of relevance of computing systems that provide services, and an emergence of eco systems that are becoming increasing more diverse, it is apparent that security techniques for eco system are useful.

SUMMARY

Broadly speaking, techniques for computing environments are disclosed. More particularly, security techniques and security systems for computing environments and systems are disclosed. The security techniques are especially suited for diverse computing environments, e.g., eco systems.

In accordance with one aspect, a security mechanism can be provided in a computing system that may include various clients and server that provide services that can be made available to the clients. The security mechanism, e.g., a computing system, security server, can effectively serve as a centralized security mechanism, e.g., a computing system, security server, for an ecosystem that can include diverse clients and servers.

In accordance with another aspect, the security mechanism can obtain redirected requests for services (service requests) that are initially made clients to the servers. In response to a redirected service request, the security system can then authenticate credentials of a client and generate a token (as a client-side token) that can be provided to the client that can, in turn, provide the client-side token to the server as a form of verification of the client's identity.

In accordance with yet another aspect, the security mechanism can obtain a token from a server. The token can be generated at least partly based on the client-side token originally generated by the security mechanism and provided to a client, e.g., a client-side token provided to a client and received by the server and is digitally signed by the server. The security mechanism can then generate another token (as a server-side token) and provide it to the server. The server-side token can include authorization information that allows access to one or more services of one or more other servers.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, a more recent development in computing environments is the emergence of eco systems. Today, eco systems are diverse and are becoming even more diverse. By way of example, an ecosystem can include various servers including, database server, analytical platforms, replication servers, various micro services. It is also anticipated that are even more diverse forms will be added in the near future resulting in even more diverse eco systems. One important aspect of these eco systems is security that typically includes verification of entities that typically request services and authorization of services for them.

In view of prevalence of computing environments and verification techniques needed to support them, especially for computing environments that provide services in increasingly more diverse environments, it is apparent that improved security techniques would be useful.

Today, it is desirable to provide a collaborative environment for eco systems. However, as the eco systems are become more and more diverse, it is becoming even more difficult to provide collaborative environments. One increasing more difficult problem is security by way of verification of various entities and authorization of access to various services available in environments with increasing more diverse clients and service providers (servers) are available and are likely to become available, e.g., ecosystems, where collaboration is highly desirable but is becoming increasing more challenging to provide in a secure manner as the environment become more and more diverse.

Conventionally, each of the servers in an ecosystem needs to be separately configured for security (verifications) that includes authentication of the entities and authorization of access to services. This conventional approach can require a significant amount of work and could create confusion between various development environments that provide and/or use these services. Furthermore, for virtually any new security feature, each development team of each service has to understand and develop them. However, separate development teams may interpret the requirements in different ways and implement them in different ways, leading to inconsistencies and/or confusion.

In view of the foregoing, improved security techniques are needed and would be highly useful, especially for diverse computing environments and systems, e.g., ecosystems, that encompass increasingly more diverse providers and services. It will be appreciated that improved security techniques can be provided that are especially suited for diverse computing environments and systems.

In accordance with one aspect, a security mechanism can be provided in a computing system that may include various clients and server that provide services that can be made available to the clients. The security mechanism, e.g., a computing system, security server, can effectively serve as a centralized security mechanism, e.g., a computing system, security server, for an ecosystem that can include diverse clients and servers.

In accordance with another aspect, the security mechanism can obtain redirected requests for services (service requests) that are initially made clients to the servers. In response to a redirected service request, the security system can then authenticate credentials of a client and generate a token (as a client-side token) that can be provided to the client that can, in turn, provide the client-side token to the server as a form of verification of the client's identity.

In accordance with yet another aspect, the security mechanism can obtain a token from a server. The token can be generated at least partly based on the client-side token originally generated by the security mechanism and provided to a client, e.g., a client-side token provided to a client and received by the server and is digitally signed by the server. The security mechanism can then generate another token (as a server-side token) and provide it to the server. The server-side token can include authorization information that allows access to one or more services of one or more other servers.

Embodiments of these aspects of the invention are also discussed below with reference to FIGS. 1-8. However, those skilled in the art will readily appreciate that the detailed description given herein with respect to these figures is for explanatory purposes as the invention extends beyond these limited embodiments.

Figure 1:
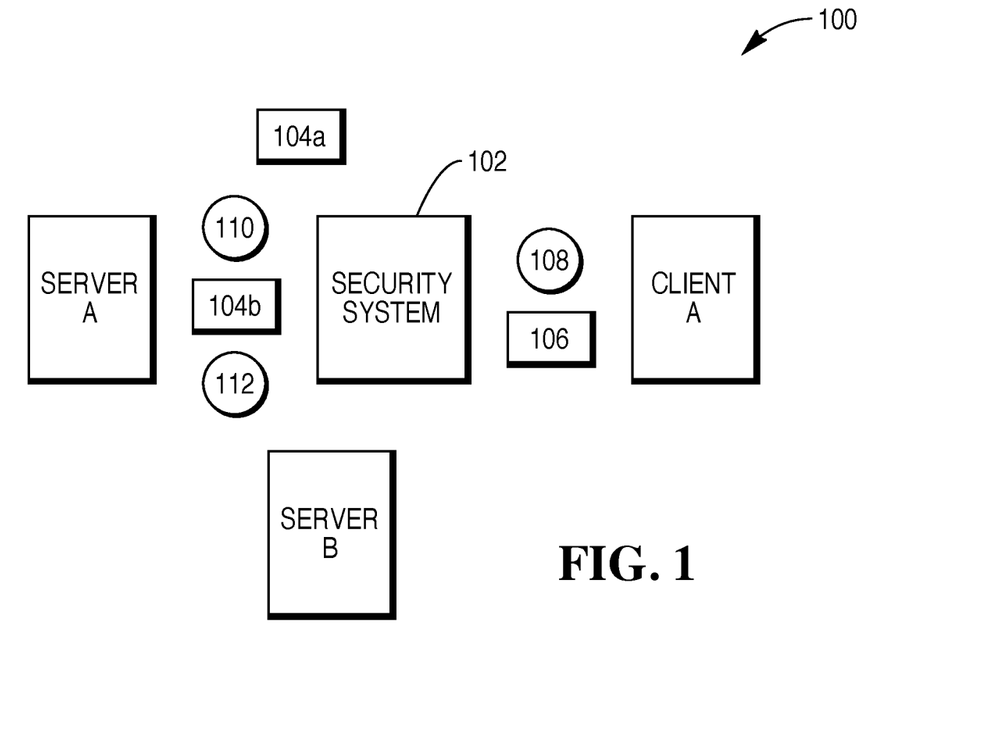
FIG. 1 depicts a computing environment representative of an ecosystem in accordance with one embodiment.

FIG. 1 depicts a computing environment 100 representative of an ecosystem in accordance with one embodiment. Referring to FIG. 1, a security system 102 can effectively function as a centralized security system for the computing environment 100 representative that includes server A and server B and a client A. The security system 102 can obtain (e.g., receive, identify, determine) a redirected request for service (or service request) 104b from the server A. Typically, the redirected service request 104b is initiated by the client A and sent to server A as an initial service request 104a. In other words, the security system 102 can receive the service request 104a as a redirected service request 104b from the server A.

Thereafter, the security system 102 can effectively initiate verification of client A (the originator of the service request). In doing so, the security system 102 can at least obtain (e.g., receive, determine, identify) authentication credentials 106 of the client A in order to verify the client A. For example, the authentication credentials 106 of the client A can be provided by the client A directly to the security system 102 as result of a request initiated by the security system 102 and sent directly to the client A. Alternatively, the security system 102 can receive the authentication credentials 106 of the client A from the server A or elsewhere.

Typically, the authentication credentials 106 of the client A can be provided by the client A directly to the security system 102. In any case, after the security system 102 obtains authentication credentials 106 of the client A, it can attempt to verify the credentials 106 of the client A. If the security system 102 cannot successfully verify the credentials 106 of the client A, it can effectively cause the service request 104A to be denied, for example, by communicating an authentication failure message via the server A and/or client A. However, if the security system 102 can successfully verify the credentials 106 of the client A, it can proceed to generate an access token 108 to effectively facilitate processing of the service request 104A for the client A. The security system 102 can generate the access token 108 at last partly based on the authentication credentials 106 of the client A. As such, the access token 108 can include authentication information of and/or associated with the client A.

Moreover, the access token 108 can be provided to the client A, for example, by the security system 102, allowing client A to use the access token 108 to effectively verify itself. For example, the security system 102 can send the access token 108 to the client A, after it generates the access token 108. Then, client A can present to access token 108 to the server A to effectively show that it has been successfully verified by the security system 102. Similarly, the security system 102 can verify another client, namely client B, for the same sever, namely server A and/or another server, namely server B, as well as other clients and servers (not shown in FIG. 1) that can be present in a diverse computing environment 100 in FIG. 1, e.g. eco systems. As such, the security system 102 can effectively serve as a central security system or entity in a diverse computing environment that include several diverse clients and servers.

It should also be noted that security system 102 can also be configured to obtain (e.g., receive, determine, identify) an access token 110 associated with the server A. It will be appreciated that the access token 110 can be made based on the access token 106 that was provided by the client A to server A. As such, the access token 110 can be similar, if not virtually identical to the access token 108, but it can also include additional access information, including identity information of the server A. Typically, the server access information of the access token 110 can identify server A and indicate that it that has requested the services of another server, for example, server B. For example, sever A can obtain the access token 108 that was provided by the client A and sign it (e.g., sign it by a private key of the server) to allow the access token 110 to identify the server A.

After the security system 102 obtains the access token 110, it can generate an access token (or a server-side access token) 112 for the server A in order to allow server A to access one or more services of another server, namely server B. The security system 102 can generate the server-side access token 112 with authentication information, allowing access to one or more services of server B. The security system 102 can generate the server-side access token 112 in a similar manner as discussed above with respect to access token 108 (or a client-side token). However, the server-side access token 112 can include authentication information allowing server B to effectively use it to gain access one or more services of server B.

Those skilled in the art will readily appreciate that the security system 102 can, for example, be provided as computing system or computer that utilizes one or more physical processors to execute computer program code that can be stored in a computer readable medium (e.g., non-transitory computer readable storage medium, memory). As such, the security system 102 can be provided as or by hardware components and/or software components.

Figure 2:
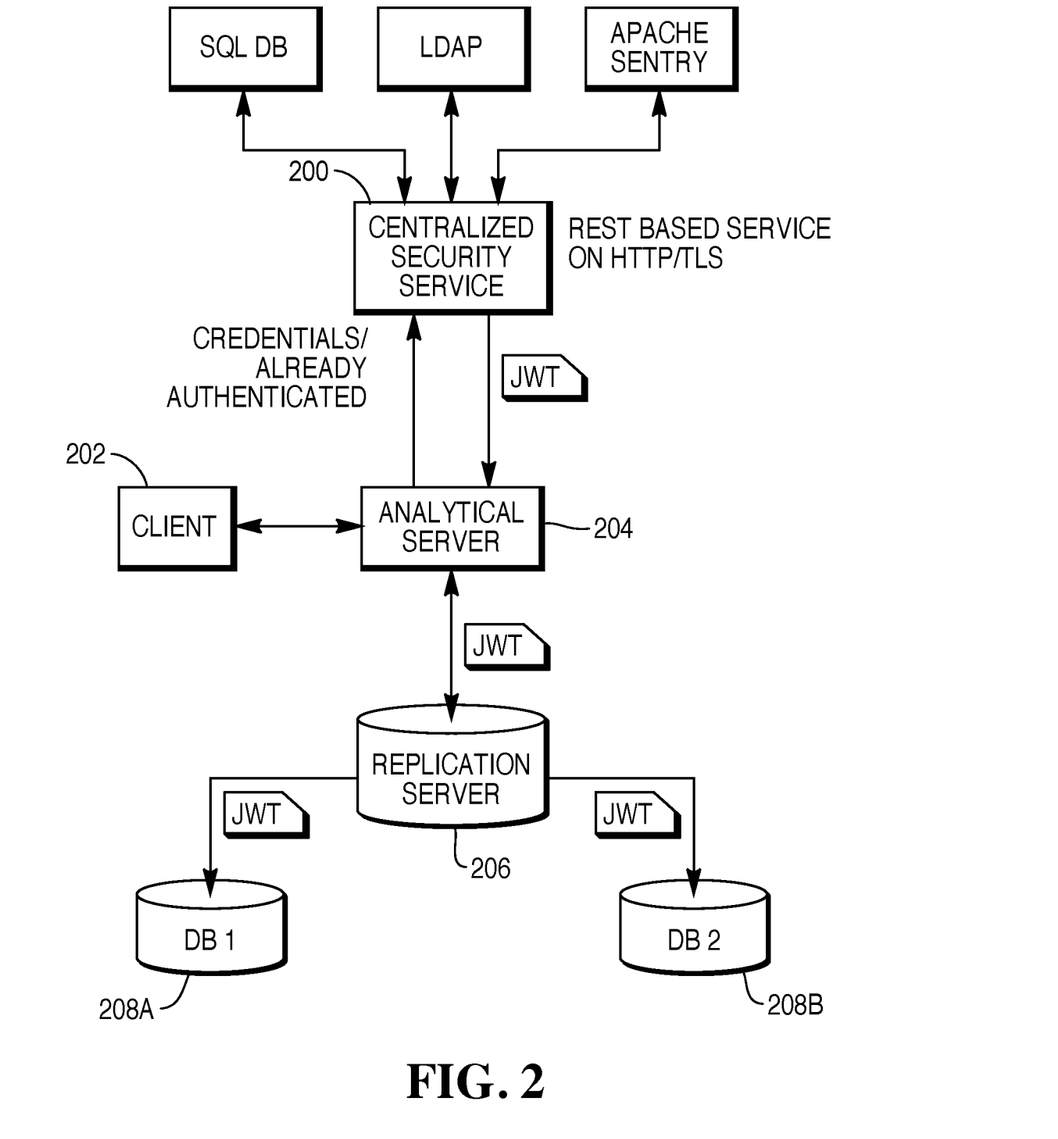
FIG. 2 depicts a centralized security service in accordance with one embodiment of the invention.

To elaborate further, FIG. 2 depicts a centralized security service (or server) 200 in accordance with one embodiment. The centralized security service 200 represents an exemplary security system 102 in accordance with one exemplary embodiment. The centralized security service 200 can facilitate authentication and authorization. For example, initially, client 202 can connect to an analytical server 204 to execute analytical queries. Then, the analytical server 204 can connect to the replication server 206 configured to two database servers, namely, database server 208A and 208B. It should be noted, conventionally, without the centralized security service 200, each one of the two database servers, namely, database server 208A and 208B would have to configured with user authentication and authorization.

The client 202 can connect to analytical server 204 in different ways, for example, by using a password-based authentication, e.g., sending an encrypted username/password. As another way, a Single Sign On (SSO), e.g., Kerberos, can be used as those skilled in the art will readily appreciate. As yet another way, multifactor authentication schemes, e.g., key token, RSA token, or biometric (finger prints, eye scans, face scans) can be used. The analytical server 204 depending on how it is configured can either authenticate the client (user) 202 or send a request the centralized security service 200 for authentication. If the analytical server 204 is configured to authenticate the client 202 then it can request an access token from the centralized security service 200. However, if the centralized security service 200 is configured for the authentication in this situation, the analytical server 204 can request the access token from the centralized security service 200 by providing, e.g., sending, its credentials. In either case, the analytical server 204 can request an access token and the request can be signed, for example, by a private key of the analytical server 204.

Then, the centralized security service 200 can verify and validate the request and authenticates the client (or user) 202. In doing so, the centralized security service 200 can, for example, use a SQL DB, e.g., sqlite, or LDAP based directory, or SSO to authenticate the identity of the client (or user) 202. The centralized security service 200 can generate an access token that ascertains the identity of the client (or user) 202. A format for the access token can, for example, be JWT (JSON Web Token) and can be signed by a private key of the central identity manager 200. This access token can also include the authorization information for each of the services that the client (or user) 202 to access. The access token can be generated and provided to the requester, namely, the analytical server 204 in this example.

The analytical server 204 can validate the access token and the client (or user) 202 can be successfully authenticated. Thereafter, when the analytical server needs to connect another server, such as, the replication server 206, it can use the access token in order to establish a connect. In this example, the replication server 206 can check if the client (or user) 202 has been authenticated and has been authorized to the access the services of the replication server 206. It should be noted that the access token can further be used by the replication server 206 to connect to the database systems 208.

Access Token Format

As noted above, a centralized security service 200 can be used for authentication in a diverse computing environment, e.g., an ecosystem. A centralized security service (CSS) can authenticate users, e.g., clients, and optionally retrieve authorization information, as well as generate a token (or access token) that ascertains the identity of the users. The format for the access token can, for example, be JWT (e.g., JSON Web Token) as documented in IETF RFC 7519 and can be signed, for example, by an CSS private key, as those skilled in the art will readily appreciate. The access token can optionally include authorization information for each of the services that users are allowed to access. To elaborate further, FIG. 3 depicts an access token 300 in accordance with one exemplary embodiment.

Figure 3:
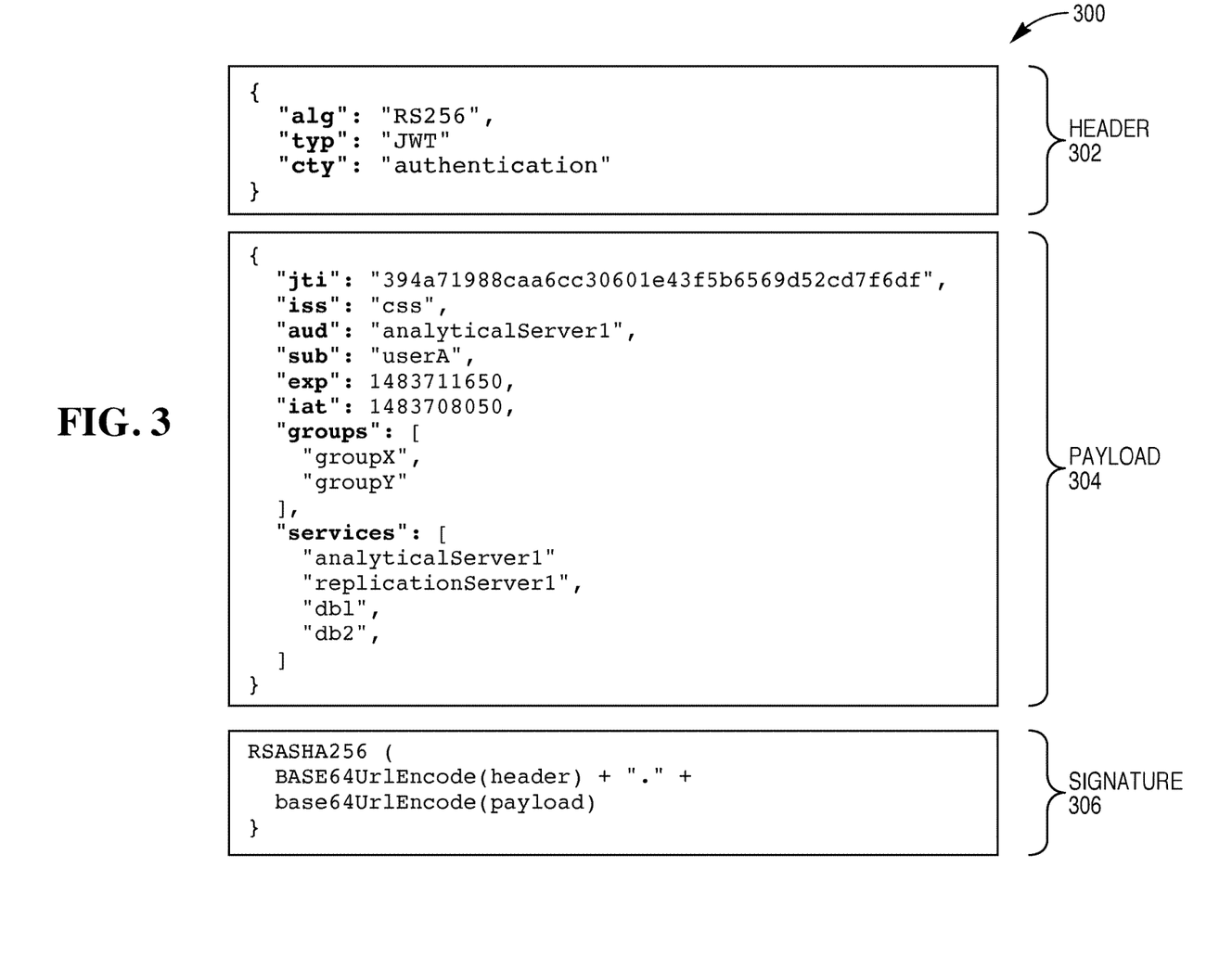
FIG. 3 depicts an access token in accordance with one exemplary embodiment of the invention.

Referring to FIG. 3, the access token 300 includes a header 302, a payload 304, and a signature 306. In the example, header 302 includes encryption algorithm (alg), token type (typ) and content type (cty). Algorithm is RS256 (RSA using SHA-256 hash algorithm) and an CSS can use two content types (authentication and authorization). In the example, Payload 304 includes information regarding the user identity and optionally information on groups the user belongs to, and services the user is allowed to access.

Table 1 below provides more information about the payload 304 depicted in FIG. 3.

TABLE 1

| | |
|---|---|
| jti | JWT token unique identifier |
| iss | Issuer who issued this token. |
| aud | Audience. CSS sets it to requester. |
| sub | Subject which identifies the user. |
| exp | Expiration (time). A number (seconds since epoch) representing when this token expires. |
| iat | Issued at (time) |
| nbf | Not before (time) |
| groups | (Optional) Groups which user is assigned to. |
| services | (Optional) Services which user to allowed to access. |

The signature 306 part of the access token 300 (shown in FIG. 3) includes: base64UrlEncode(header)+"."+base64UrlEncode(payload) signed using algorithm specified in header part. The Access token can be generated by converting the three parts using base 64 (URL) encoding and adding "." to separate each part as shown below:

Base64UrlEncode(HEADER).Base64UrlEncode(PAYLOAD).Base64UrlEncode(SIGNATURE)

After the Access token is generated it can be issued to the requesting service. The unique ID of the access token can be noted in CSS until the token is valid or until access token is refreshed or invalidated.

Authorization

Figure 4:
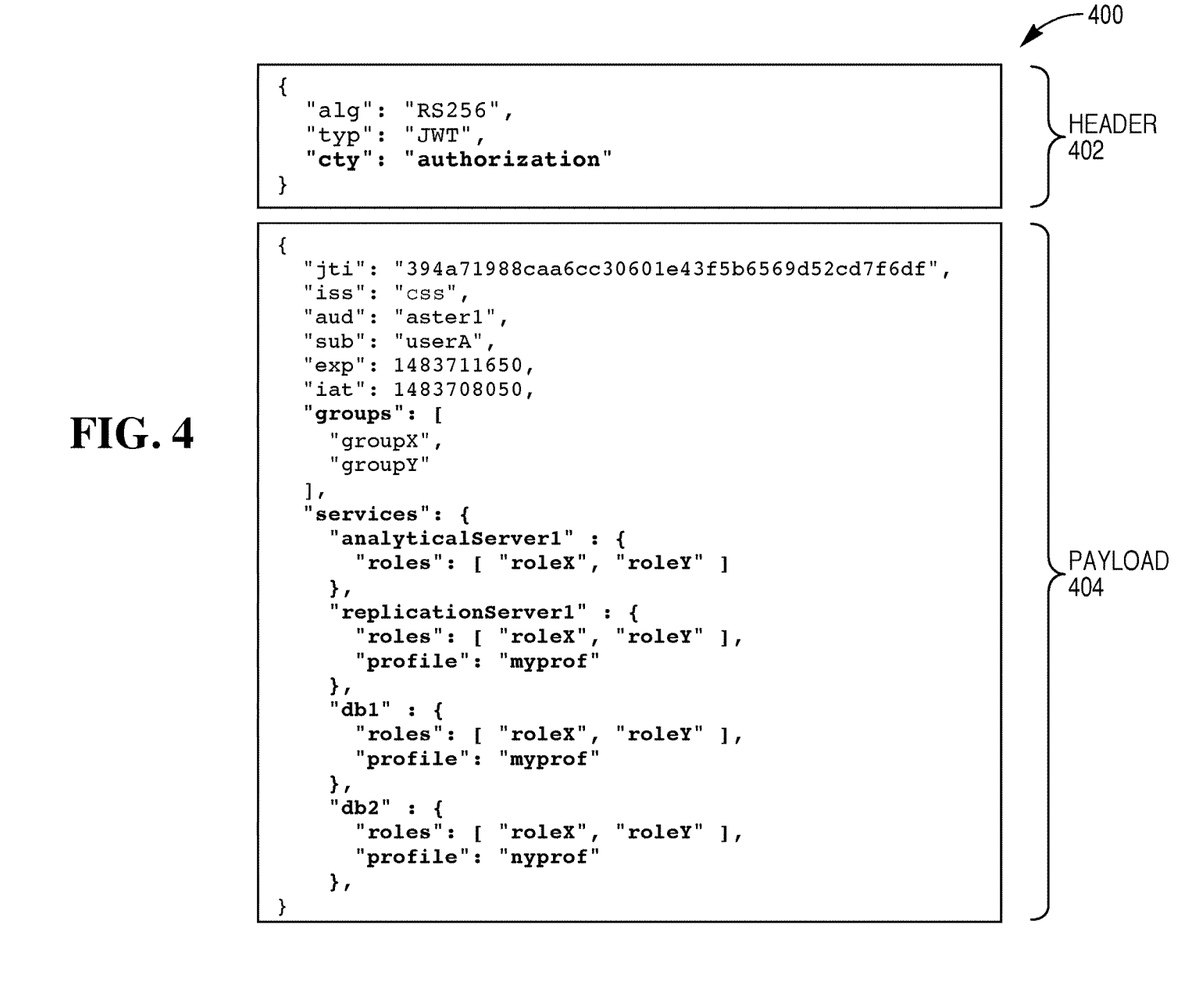
FIG. 4 depicts an authorization token that includes a header and a payload 404 in accordance with one embodiment.

A centralized security service (CSS) can also be optionally configured for retrieving authorization information for each individual service that a user is authorized to access. This authorization information can be used by services. Moreover, the users can save a significant amount of time during connection establishments. To further elaborate, FIG. 4 depicts an authorization token 400 that includes a header 402 and a payload 402 in accordance with one embodiment. In case of an authorization token, each service entry can include authorization information for each configured service. For example, for "db1" service token includes "roles" and "profile" information assigned, so when db1 service gets this token, it can just use this information, thereby saving a significant amount of time during connection establishment.

Interoperability with External Services

In a typical environment the services in an ecosystem, contact to external services are needed (e.g., Hadoop, Postgres SQL, Oracle) in order to complete user (e.g., customer) queries. An CSS can also be used in this case to provide a complete and secure solution the CSS can effectively control access to the external services. Two exemplary ways by which a service can connect to an external service are described below.

Using Credential Based Authentication

Figure 5:
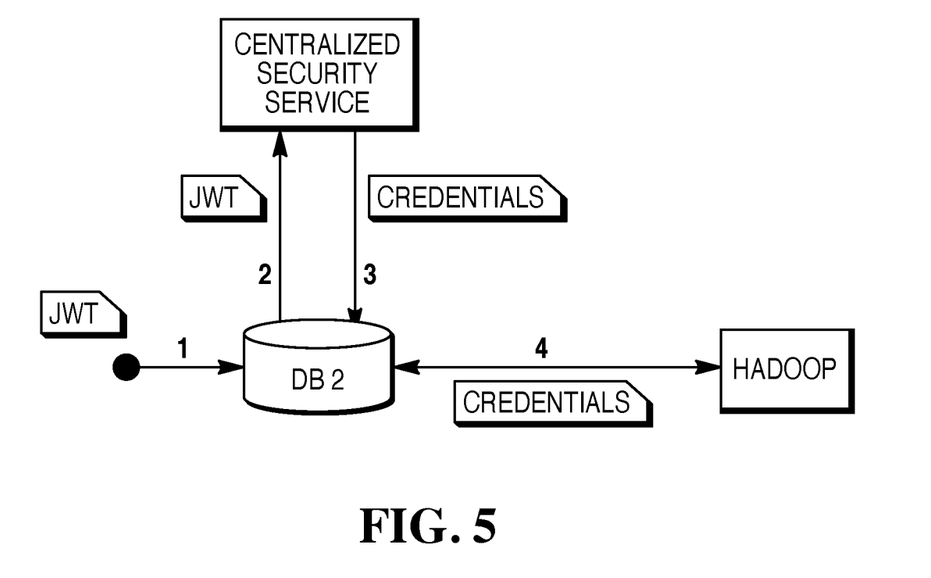
FIG. 5 depicts a service making request for credentials of an external service in accordance with one exemplary embodiment.

A CSS can be configured to save the credentials, e.g., username, password, that can be used to connect to external services. virtually any service that needs to connect to external services can contact the CSS and make a request for credentials. FIG. 5 depicts a service making request for credentials of an external service in accordance with one exemplary embodiment.

Using Kerberos SSO

Figure 6:
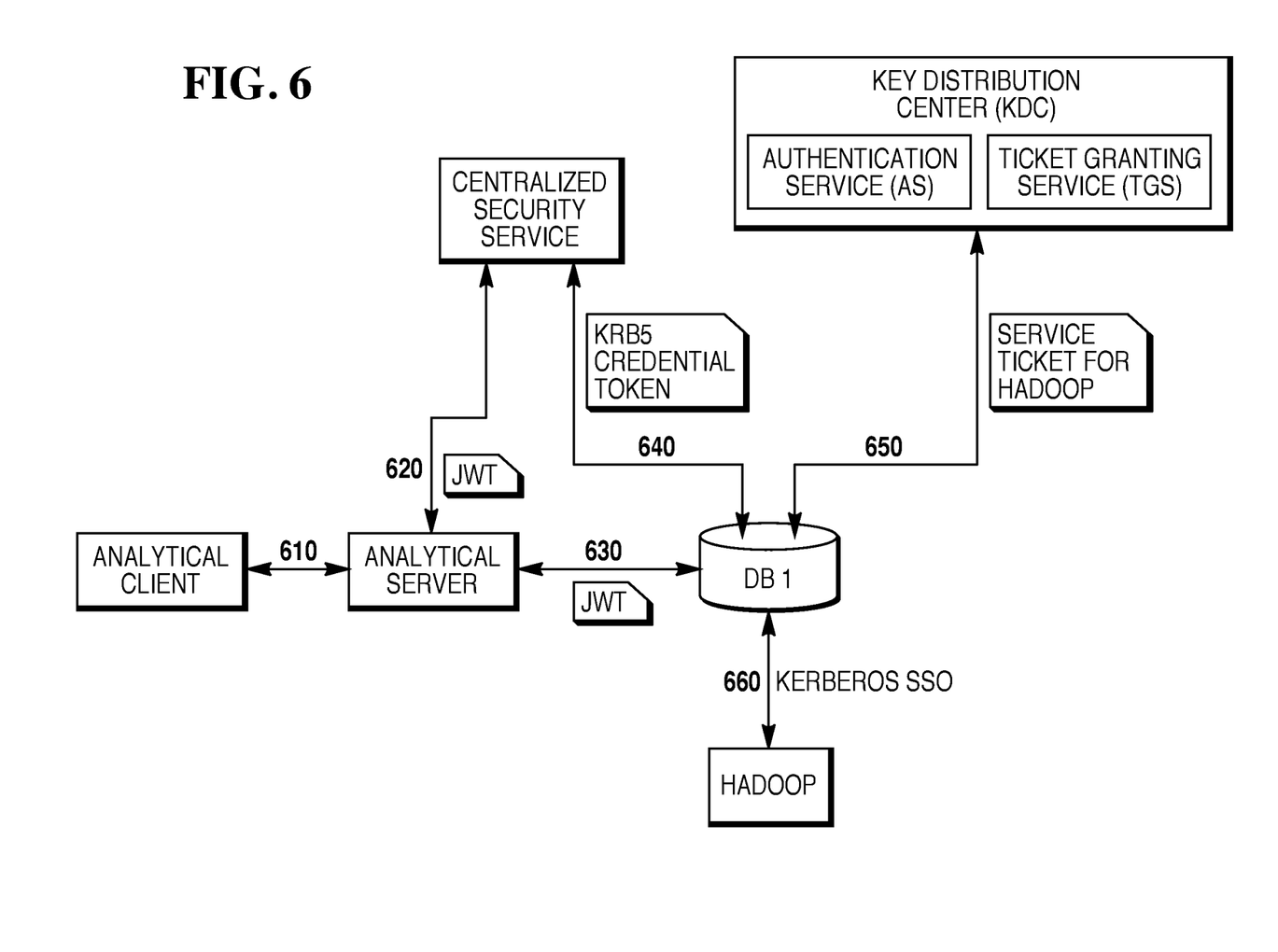
FIG. 6 depicts a service for requesting credentials of external service in accordance with another exemplary embodiment.

As another example, a CSS can be also configured to work with Kerberos delegated credentials, which can be used to connect external service through SSO. Virtually any service that needs to connect to external service can contact the CSS and make a request for delegated credentials of the user. FIG. 6 depicts a service for requesting credentials of an external service in accordance with another exemplary embodiment.

Referring to FIG. 6, in the first phase (610) an analytical client runs kinit (using—f flag for a "forwardable" ticket) and gets Kerberos TGT from Kerberos KDC that is used to get a service ticket for analytical service(s) using GSS API, and as part of a connection establishment the service ticket is forwarded to Analytical server.

Next, in the second phase (620) the analytical server authenticates the service ticket received from the Analytical client using GSS API and gets the delegated credentials token. Then, the server will request for access token from the CSS together with the credentials token in the request. After checking all the validations required, the CSS issues an access token and also saves the delegated credentials token.

Thereafter, in the third phase (630) the analytical service connects to next service, namely Database DB1 in this example, using the access token. In the fourth (640) phase if Database DB1 wants to connect to external service, for example, "Hadoop" using "Kerberos SSO," it requests the credential token from the CSS. As a result, the CSS after checking whether the user is allowed to access the external service, can return the credentials token accordingly if the access is allowed. In the fifth (650) phase, the Database DB1 after receiving credentials token saves it as credential cache and uses it to get service ticket for external service (in this a Hadoop). Finally, in the sixth (660) phase, the Database DB1 connects to Hadoop using Kerberos SSO.

Figure 7:
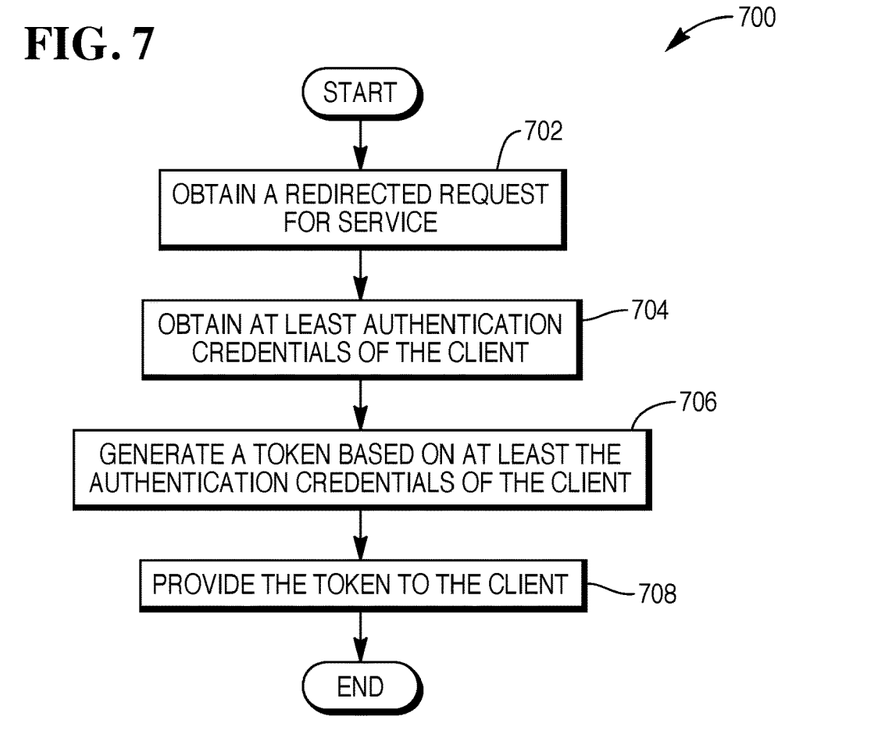
FIG. 7 depicts a security method for providing security in a computing environment in accordance with one embodiment.

To elaborate even further, FIG. 7 depicts a security method 700 for providing security in a computing environment in accordance with one embodiment. It should be noted that the computing environment includes at least one client and at least one server configured to provide one or more services. The computer-implemented method 700 can, for example, be implemented at least partially by one or more physical processors configured to process executable computer code that can be stored in a non-transitory computer readable storage medium. The security method 700 can, for example, be implemented by the security system 102 (shown in FIG. 1).

Referring to FIG. 7, initially, a redirected request for service is obtained (702). The redirected request for service is an initial request for service made by the client to the sever for one or more services of the server. Next, at least authentication credentials of the client are obtained (704). The authentication includes information associated with the client and indicates that the identity of the client has been verified. Thereafter, a token is generated (706) based at least on the authentication credentials of the client. The token includes authentication information associated with the client and indicates that the identity of the client has been verified. The token is provided (708) to the client, thereby allowing the client to send the first token to the server to indicate that the identity of the client has been verified. Security method 700 ends after the token is provided (708) to the client.

Although not shown in FIG. 7, the identity of the client can be verified based on the obtained authentication credentials of the client. In addition, authentication credentials from the client can be requested and the send the first token to the client. It should also be noted that the server can, for example, be a database server configured to provide access to one database services of a database.

Figure 8:
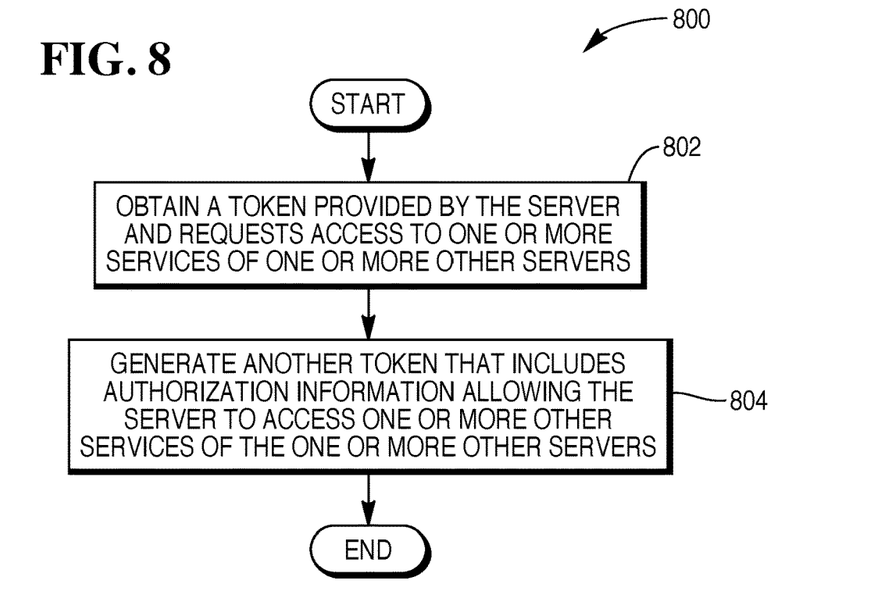
FIG. 8 depicts a security method for providing security in a computing environment in accordance with one embodiment.

To elaborate even further, FIG. 8 depicts a security method 800 for providing security in a computing environment in accordance with one embodiment. It should be noted that the computing environment can include at least one client and two or more servers each configured to provide one or more services. The security method 800 can, for example, be implemented at least partially by one or more physical processors configured to process executable computer code that can be stored in a non-transitory computer readable storage medium. The security method 800 can, for example, be implemented by the security system 102 (shown in FIG. 1). Referring to FIG. 8, initially, a token is obtained (802). It should be noted that the token has been provided by the server and requests access to one or more services of one or more other servers in the computing environment. The token can include verification information of at least one client and it can identify that the server that provided that token. Typically, this token is generated based on a token that was provided by the client to server in order to authenticate the client. Thereafter, another token is generated (804) that includes authorization information allowing the server access to one or more other services from one or more other servers, thereby allowing the server to send the generated token to the one or more other servers to indicate that it has been authorized to access the one or more other services from one or more other servers. The method 800 ends after the token is generated (804). It should be noted that security methods 700 and 800 can be combined and implemented together by a single entity (e.g., security system 102).

In view of the foregoing, it will be appreciated that centralized security service can address various issues. One issue is that different users can be configured in relation to different services, but they can be used as part of the same service request. Services may be able to store authentication information, e.g., user/password, for connecting to next service. Virtually, all services can use the same type of authentication mechanisms, e.g., password based, LDAP, Kerberos, but can still operate separately. Although, it may possible to use Kerberos for solving some of the issues, it may not be feasible and/or desirable to do so at least for some environments, e.g., cross realms environments, cloud environments. Kerberos can be used by virtually all the services the credentials are saved and moved as desired.

However, this approach may leave some security concerns. Instead, the centralized security service can be used to allow delegation for accessing the next service.

Furthermore, conventionally, each server has to be separately configured for authorization and a change in security policy of an organization can require a significant amount of time and resources but still security holes can be created as a result of making the change. For virtually any new security feature, each development team of each service has to understand and develop them, but two development teams may interpret the requirements in different ways and implement them in different ways, leading to inconsistencies and/or confusion.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system that includes one or more processors configured to execute computer executable code, wherein the one or more processors are further configured to:
    obtain, from a first server, a redirected request for service, wherein the redirected request for service is an initial request for service made by a client to the first sever for one or more services of the first server;
    obtain at least authentication credentials of the client, wherein the authentication credentials of the client are needed to verify the identity of the client;
    generate a first token based on at least the authentication credentials of the client, wherein the first token includes authentication information associated with the client, indicating that the identity of the client has been verified;
    provide the generated first token to the client, thereby allowing the client to send the first token to the first server to indicate that the identity of the client has been verified at least partly based on the authentication information;
    obtain a second token, wherein the second token has been provided by the first server and requests access to one or more other services of one or more other servers, after the client has sent the first token to the server to indicate that the identity of the client has been verified, and wherein the one or more other servers are different than the first server that has received the first token; and
    generate a third access token, wherein the third access token includes authorization information allowing the first server to access the one or more other services of the one or more other servers, thereby allowing the first server to send the third token to the one or more other servers to indicate that it has been authorized to access the one or more other services from the one or more other servers.

2. The computing system of claim 1, wherein the one or more processors are further configured to:
    verify the identity of the client based on the obtained authentication credentials of the client.

3. The computing system of claim 1, wherein the second token includes the first token and identifies the server.

4. The computing system of claim 1, wherein the second token is the first token that is signed by the server.

5. The computing system of claim 1, wherein the one or more processors are further configured to:
    request the authentication credentials from the client, and send the first token to the client.

6. The computing system of claim 1, wherein the server is a database server configured to provide access to one database services of a database.

7. A computer-implemented method of providing security in a computing environment that includes at least one client and at least one server configured to provide one or more services, wherein the computer-implemented method is implemented at least partially by one or more physical processers configured to process executable computer code, and wherein the computer-implemented method comprises:
    obtaining, from the server, a redirected request for service, wherein the redirected request for service is an initial request for service made by the client to the sever for one or more services of the server;
    obtaining at least authentication credentials of the client, wherein the authentication credentials of the client are needed to verify the identity of the client;
    generating a first token based at least on the authentication credentials of the client, wherein the first token includes authentication information associated with the client and indicates that the identity of the client has been verified;
    providing the first token to the client, thereby allowing the client to send the first token to the server to indicate that the identity of the client has been verified; and
    obtain a second token, wherein the second token has been provided by the server and requests access to one or more services of one or more other servers.

8. The computer-implemented method of claim 7, wherein the computer-implemented method further comprises:
    verifying the identity of the client based on the obtained authentication credentials of the client.

9. The computer-implemented method of claim 7, wherein the computer-implemented method further comprises:
    generating a third token, wherein the third token includes authorization information allowing the server to access one or more other services of the one or more other servers, thereby allowing the server to send the third token to the one or more other servers to indicate that it has been authorized to access the one or more other services from one or more other servers.

10. The computer-implemented method of claim 9, wherein the second token includes the first token and identifies the server.

11. The computer-implemented method of claim 9, wherein the second token is the first token that is signed by the server.

12. The computer-implemented method of claim 7, wherein the computer-implemented method further comprises:
  requesting the authentication credentials from the client, and sending the first token to the client.

13. The computer-implemented method of claim 7, wherein the server is a database server configured to provide access to one database services of a database.

14. A non-transitory computer readable storage medium storing at least executable code that when executed provides security in a computing environment that includes at least one client and at least one server configured to provide one or more services, and wherein the executable code when executed further:
  obtains, from the server, a redirected request, wherein the redirected request for service is an initial request for service made by the client to the sever for one or more services of the server;
  obtains at least authentication credentials of the client, wherein the authentication credentials of the client are needed to verify the identity of the client;
  generates a first token based at least on the authentication credentials of the client, wherein the first token includes authentication information associated with the client and indicates that the identity of the client has been verified;
  provides the first token to the client, thereby allowing the client to send the first token to the server to indicate that the identity of the client has been verified; and
  obtain a second token, wherein the second token has been provided by the server and requests access to one or more services of one or more other servers.

15. The non-transitory computer readable storage medium of claim 14, wherein the executable code when executed further:
  verifies the identity of the client based on the obtained authentication credentials of the client.

16. The non-transitory computer readable storage medium of claim 14, wherein the executable code when executed further:
  generates a third token, wherein the third token includes authorization information allowing the server to access one or more other services of the one or more other servers, thereby allowing the server to send the third token to the one or more other servers to indicate that it has been authorized to access the one or more other services from one or more other servers.

17. The non-transitory computer readable storage medium of claim 16, wherein the second token includes the first token and identifies the server.

18. The non-transitory computer readable storage medium of claim 16, wherein the second token is the first token that is signed by the server.

19. The non-transitory computer readable storage medium of claim 16, wherein the executable code when executed further:
  requests the authentication credentials from the client, and sends the first token to the client.

* * * * *